United States Patent [19]

Mercer

[11] Patent Number: 4,536,429
[45] Date of Patent: Aug. 20, 1985

[54] PLASTICS MATERIAL MESH STRUCTURE

[75] Inventor: Frank B. Mercer, Blackburn, England

[73] Assignee: P.L.G. Research Limited, Blackburn, England

[21] Appl. No.: 652,885

[22] Filed: Sep. 21, 1984

Related U.S. Application Data

[63] Continuation of Ser. No. 568,932, Jan. 10, 1984, abandoned, which is a continuation of Ser. No. 429,609, Sep. 30, 1982, abandoned.

[30] Foreign Application Priority Data

Oct. 5, 1981 [GB] United Kingdom ............... 8130021

[51] Int. Cl.$^3$ ............................................. B32B 3/10
[52] U.S. Cl. ............................ 428/136; 264/288.4; 264/288.8; 264/290.2; 264/291; 264/DIG. 47; 264/DIG. 74; 264/DIG. 81; 428/131; 428/255; 428/910
[58] Field of Search ............... 428/131, 134, 135, 136, 428/255, 910; 264/288.4, 288.8, 290.2, 291, DIG. 47, DIG. 74, DIG. 81

[56] References Cited

U.S. PATENT DOCUMENTS

| | | | |
|---|---|---|---|
| 3,386,876 | 6/1968 | Wyckoff | 161/109 |
| 4,374,798 | 2/1983 | Mercer | 264/288.8 |
| 4,394,342 | 7/1983 | Mercer | 264/292 |

FOREIGN PATENT DOCUMENTS

| | | |
|---|---|---|
| 1435107 | 11/1968 | Fed. Rep. of Germany . |
| 94251 | 12/1972 | German Democratic Rep. . |
| 969205 | 9/1964 | United Kingdom . |
| 1055963 | 1/1967 | United Kingdom . |
| 1116181 | 6/1968 | United Kingdom . |
| 1261515 | 1/1972 | United Kingdom . |
| 1276300 | 6/1972 | United Kingdom . |
| 2034240 | 6/1980 | United Kingdom . |
| 2059866 | 4/1981 | United Kingdom . |
| 2035191 | 6/1982 | United Kingdom . |
| 2073090 | 6/1982 | United Kingdom . |
| 2096531 | 10/1982 | United Kingdom . |

*Primary Examiner*—Marion E. McCamish
*Attorney, Agent, or Firm*—Holman & Stern

[57] ABSTRACT

In order to provide uniaxially-stretched and biaxially-stretched mesh structures which allow for different specific designs of the interconnecting strands, a special punching pattern is used to provide holes in the starting material. The starting material has a "square" pattern of large holes. Further holes are added. These further holes can be small holes which are staggered and in pairs. When the starting material is stretched, the uniaxially-stretched structure has transverse bars interconnected by highly orientated strands each of which forks at both ends into further highly orientated strands, providing a structure which is particularly suitable for soil reinforcement. When the structure is stretched in the direction at right angles to form a biaxially-stretched structure, the zones of the bars which are between aligned strands remain as unorientated or partly orientated junctions. The remaining zones of the bars are stretched out to form highly orientated strands. This biaxially-stretched structure is particularly suitable for soil stabilization.

17 Claims, 11 Drawing Figures

PLASTICS MATERIAL MESH STRUCTURE

This is a continuation of application Ser. No. 568,932, filed Jan. 10, 1984, now abandoned, which is a continuation of application Ser. No. 429,609, filed Sept. 30, 1982 now abandoned.

BACKGROUND OF THE INVENTION

GB No. 2 035 191B, GB No. 2 073 090B, GB No. 2 034 240A and GB No. 2 096 531A describe the production of integral plastics material mesh structures by stretching a starting material having therein a uniform, regular or repeat pattern of holes or depressions which form the mesh openings in the mesh structures. The starting materials can be uniaxially stretched or biaxially stretched in two stretching directions at a substantial angle to each other, normally substantially at right angles to each other.

The mesh openings in the mesh structures of GB No. 2 035 191B and GB No. 2 073 090B and in some of the mesh structures of GB No. 2 096 531A have their centres on a notional square or rectangular grid, and the present invention primarily relates to such structures. It is a general object of the invention to provide more varied structures for specific end uses, such as uniaxially stretched structures for soil reinforcement or cement composites and biaxially stretched structures for soil stabilization, asphalt reinforcement or fencing. In general terms, the starting materials should not have too high a percentage of their plan view area formed by holes or depression, particularly if the starting materials are formed by punching out, and the starting materials should be relatively easy to provide and the mesh structure should be relatively easy to produce by stretching.

Definitions

The depressions are not necessarily formed by the application of pressure.

The openings in the mesh structures may be closed by thin membranes.

The term "orientated" means molecularly orientated. In general, when an orientated strand is referred to, the preferred direction of orientation is longitudinally of the strand.

The terms "highly orientated" and "orientated only to a low degree" are in the broadest sense only comparative terms, the former meaning substantially more orientation than the latter. However, highly orientated preferably means that a stretch ratio of 4:1, 5:1 or greater has been applied on the strand. Orientated only to a low degree preferably means that the stretch ratio applied to the zone in question is not greater than 3:1, which is most easily determined (though the figures do not correspond exactly) if it is stated that the thickness has not been reduced by more than two thirds of the starting material thickness.

The terms "uniax" and "biax" mean uniaxially stretched and biaxially stretched, respectively.

The terms "N-S" and "E-W" mean "north-south" and "east-west" and are used for convenience to denote two directions at right angles on a starting material or mesh structure. Where "E-W rows" are referred to, the rows are those which extend in the E-W direction. If a stretching operation is being described, the first effective stretch is in the N-S direction and the second effective stretch (if any) is usually in the E-W direction. However, these directions are only notional, and the actual directions on a production machine can be chosen as suitable—for example the N-S direction can be machine direction (MD), transverse direction (TD), or any other suitable direction.

The term "thick" refers to the dimension normal to the plane of the material or mesh structure and the term "width" refers to the appropriate dimension in the plane of the material or mesh structure. Where the width of said parts is referred to below, it is the distance at right angles to the centre line of the part between mesh openings on each side of the part. The thickness of the starting material or of the mesh structure is the distance between the extreme faces of the material or mesh structure. The thickness of a strand is the thickness of the strand cross-section, but ignoring raised edges. Particularly if the original holes or depressions have no radiussing where they issue at the faces of the sheet, the strands will have a "pin-cushion" cross-section, with raised edges and lower centres; the thickness will be as measured inwardly of the raised edges.

Stretch ratios are either given overall or "on the strands". If they are given on the strands, they are measured by measuring the distance moved by the respective ends of the openings on either side of the strand. The ratios are as measured after relaxation.

A "tangent line" is a notional line tangential to the holes or recesses of a row.

"HDPE" is high density polyethylene.

THE INVENTION

The present invention provides structures as set forth in claim 1 or 14 and methods as set forth in claim 8 or 13. The remaining claims set forth preferred features of the invention.

It has been observed that in the uniax structures of the invention, there are E-W bands which run substantially right across the structure substantially at right angles to the direction of stretch. These bands can be continuous along their centre lines; such bands can be like bars and be unorientated along their centre lines or possibly with zones which are regularly spaced and orientated only to a low degree; in other structures, these bands can be formed of regularly spaced zones which are unorientated or orientated only to a low degree, interspersed by zones which have a high degree of orientation in the N-S direction. As another alternative, the bands may be discontinuous along their centre lines, being formed by regularly spaced zones which are unorientated or orientated only to a low degree, interrupted by regularly-spaced mesh openings; the continuity of the band is ensured by each discontinuous length being connected to the adjacent discontinuous length of the same band by at least two highly orientated strands whose axes are inclined to each other but which extend generally in the N-S direction; each of the highly-orientated strands has one end connected to a respective discontinuous length and the other end connected to the other highly orientated strand at a junction zone. Between these bands, and interconnecting the bands generally in the N-S direction, there are highly orientated interconnecting strands which can assume a variety of different configurations. Although the concept is the same, the advantages of the different configurations depend upon the specific configuration, and are set out below in connection with the preferred embodiments.

In general terms, the structures of the invention are preferably formed as flat structures, although they can be subsequently rolled up.

There will be a substantial number of said parts or bands, the number depending on whether they extend in the MD or TD. There would normally be at least ten such parts or bands. If said parts are continuous, they will not be very wide, for instance not being more than four, five or ten times the thickness of the starting material.

The structures of the invention are preferably substantially uniplanar.

Apart from the specific embodiments described hereafter, many other configurations are possible. Thus any suitable feature set out in the GB Patent Specifications referred to above can be incorporated, for example the various plastics materials, thicknesses, hole or depression shapes or orientation, hole or depression sizes, hole or depression pitches and stretch ratios. The holes are preferably formed by punching.

If the E-W bands referred to above are continuous along their centre lines, it is desirable that the interconnecting strands are joined to the bands at the same positions on either side, i.e. the position where one interconnecting strands joins is directly opposite the position where the other joins. The orientation in the interconnecting strands need not pass into the bands themselves, i.e. need not pass beyond the tangent lines. Nonetheless, it is preferred that the orientation passes into the band, generally as described in GB No. 2 073 090B.

Apart from the holes or depressions specified, further holes or depressions can be formed in the starting material.

PREFERRED EMBODIMENTS

The invention will be further described, by way of example, with reference to the accompanying drawings, in which.

Figures 1A, 1B:
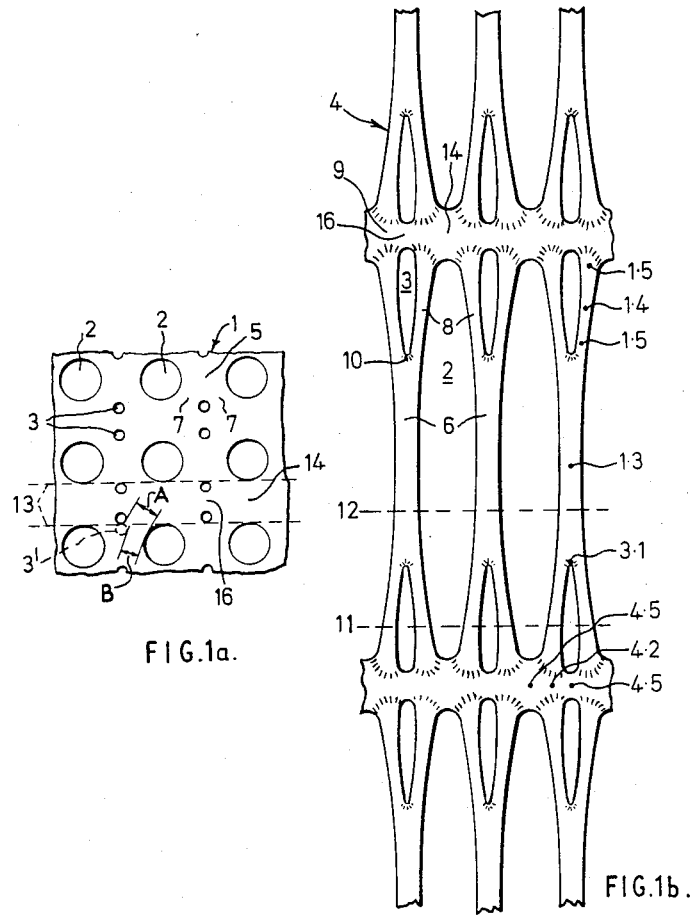
FIGS. 1a, 1b and 1c are plan views of a starting material, uniax structure and biax structure in accordance with the invention.
Figures 2A, 2B:
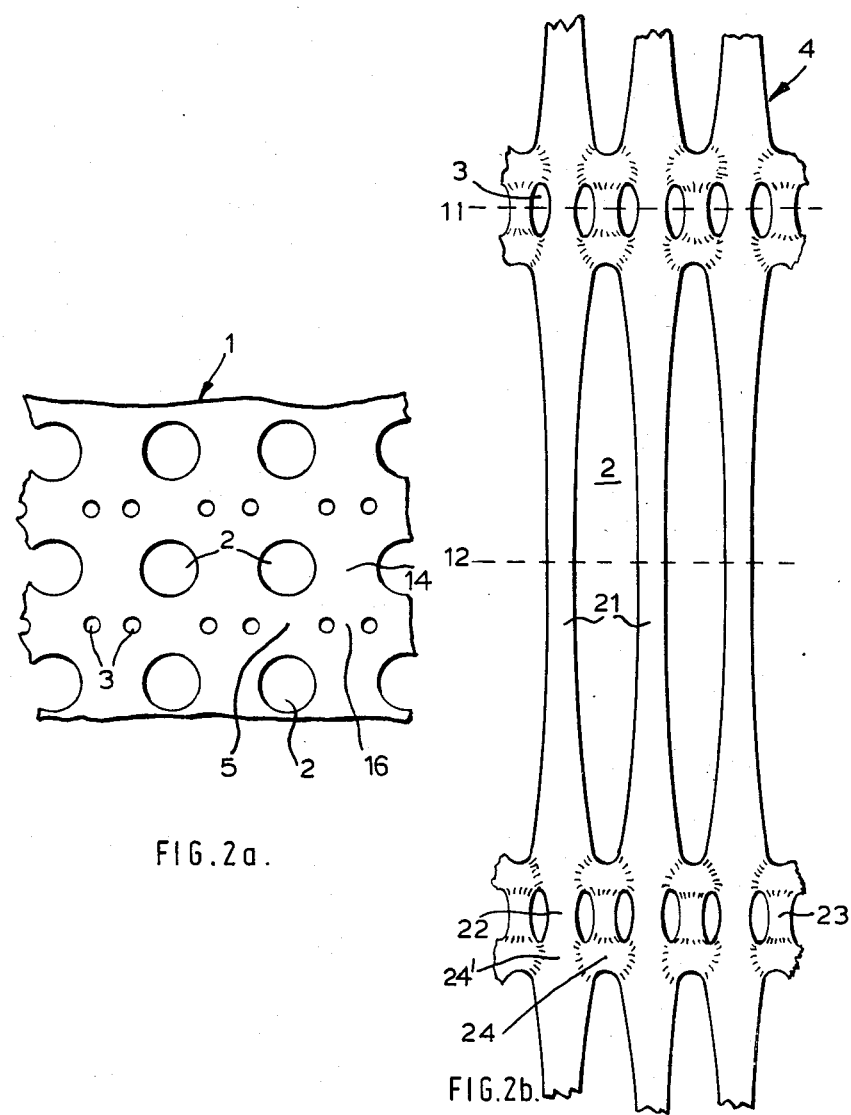
FIGS. 2a and 2b are plan views of a starting material and a uniax structure in accordance with the invention.
Figure 3A:
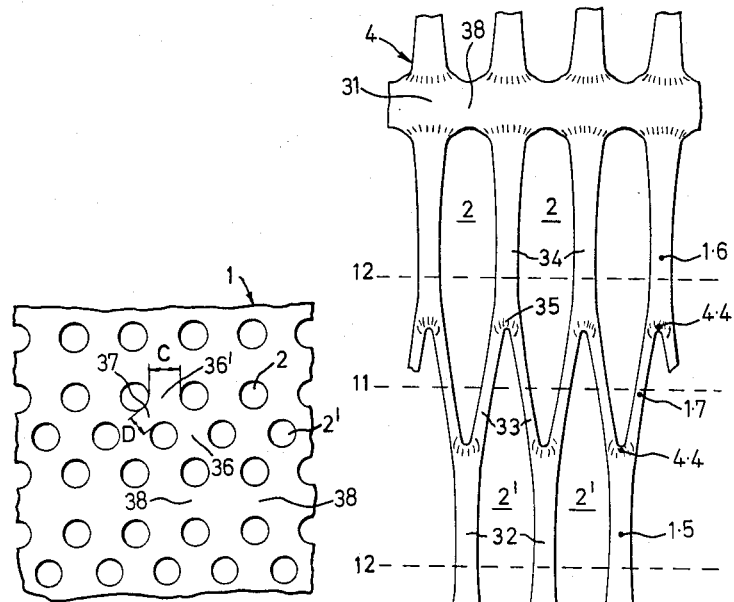
FIGS. 3a, 3b and 3c are plan views of a starting material, uniax structure and biax structure in accordance with the invention.
Figure 3B:
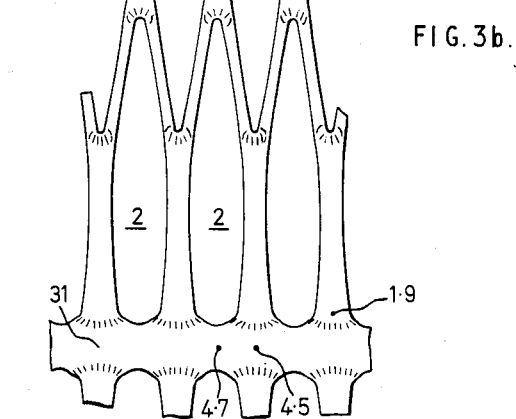

FIGS. 1b, 2b and 3b were drawn from laboratory samples, though variations were noted across the width of the samples. The remaining Figures showing uniax or biax structures are theoretical.

In the respective Figures, the lines ("profile shading") which indicate the profile of the structure extend up and down the slope, following the line of maximum gradient, i.e. at right angles to conventional contour lines.

All the starting material shown in the drawings are strictly uniplanar, having flat, parallel faces, and the uniax and biax structures produced therefrom are strictly uniplanar. The specific dimensions etc of the starting materials shown in the drawings are set forth in the Table below.

The thicknesses at various points on the structures are shown in millimeters in FIGS. 1b, 1c, 3b and 3c.

The GB Patent Specifications referred to above give full details of the stretching procedures for the individual structures, and those details are, where appropriate, applicable to the present invention.

FIGS. 1a and 1b

The starting material 1 of FIG. 1a has a regular pattern of holes (or depressions) 2,3 therein. The large holes 2 are in E-W rows (extending substantially at right angles to the N-S stretching direction), and have their centres on a notional, substantially square or rectangular grid with the side thereof substantially parallel to the N-S stretching direction. All the large holes 2 are substantially identical. Between each pair of adjacent rows, there are two E-W rows of small holes 3 with their centre lines between the centre lines of the rows of large holes 2. The small holes 3 also have their centres on a notional square or rectangular grid, but are staggered so as to be half way between the large holes 2 as seen looking in the N-S direction.

When the starting material 1 is stretched N-S, the uniax structure 4 shown in FIG. 1b can be formed. The actual structure depends upon the amount of stretching and also upon the amount of E-W contraction permitted. The zones 5 stretch out to form first, spaced, parallel, highly orientated interconnecting strands 6 extending N-S in E-W rows. The zones 7 between the larger holes 2 and the smaller holes 3 stretch out into highly orientated second strands or legs 8, forking from both ends of the first interconnecting strands 6. The zones where the legs 8 meet continuous E-W parts or bands or bars 9 are similar to those in GB No. 2 073 090B, as indicated by the profile shading. The orientation may pass into the bars 9 and may, if desired, pass right through the bars 9. Thus a section taken normal to the plane of the structure and along the E-W centre line of a bar 9 may have flat, parallel faces or may have undulating faces. This particular sample was stretched without E-W constraint, and some very slight E-W contraction occurred, indicating that the orientation passed right across the bars 9. A parallel section taken along the tangent line tangential to the large mesh openings 2 will preferably have undulating faces. In the crotches where the legs 8 meet the strands 6, there are thicker zones or blobs 10 which are orientated to a low degree, though are substantially thinner than the starting material 1. Apart from these blobs 10, the orientation in the strands 6 passes directly into that of the legs 8.

Two notional E-W lines 11,12 can be drawn, the line 11 crossing twice as many strands or legs 8 as the strands 6 crossed by the line 12.

There are E-W rows of mesh openings 2,3. The openings 2 are substantially longer N-S, and overlap, the openings 3.

The uniax structure 4 of FIG. 1b is suitable for soil reinforcement, having transverse bars 9 interconnected by highly orientated, longitudinal strands 6,8. Compared to the uniax structure of GB No. 2 073 090B, it is found that the strands or legs 6,8 can be orientated further without transmitting too much orientation across the bars 9. It is found that if too much orientation is taken across the bars, i.e. if zones of the bars are orientated too much in the N-S direction, there is a danger of splitting if the bars are bent in the soil, which splitting can propagate along the highly orientated interconnecting strands. The invention can thus provide a structure which is stronger and more economic, i.e. having a greater tensile strength per unit mass of resin. The FIG. 1b structure either enables material to be saved by reducing the width (N-S) of the bars 9 or by increasing the stretch ratios applied to the interconnecting strands. It is also found that the structure 4 has good resistance to long term creep and rupture.

The structure 4 of FIG. 1b has good balance between the interconnecting strands 6 and the legs 8 in that the stretch ratios (on the strands) are approximately equal, about 11.5:1. As measured at the mid-points of the respective strands or legs 6,8, the cross-section of each leg 8 is about half that of each strands 6. The balance of properties can be changed by altering the positions of the small holes 3 in relation to the tangent lines 13 (tangent to the large holes 2), altering the sizes of the small holes 3 in relation to those of the large holes 2, and altering the shapes of the small holes 3. The important parameter is considered to be the width of the zone 7. In full lines in FIG. 1a, the small holes 3 are shown inside but touching the tangent lines 13, and the width of the zone 7 is indicated as A. The small holes 3 could be further within the tangent lines 13, could be intersected by the tangent lines 13 or could be outside the tangent lines 13. The effect is illustrated by the hole 3' shown in FIG. 1a, showing that the effective width of the zone 7, indicated as B, has been reduced. With the holes 3', the starting material 1 tends to yield first at the zones 7 so that the legs 8 are substantially stretched before the zones 5 yield to form the interconnecting strands 6. There is little difference in strength whether the holes 3 are inside or outside the notional tangent lines 13. However, on rupture, the structure 4 tends to break in the centres of the strands 6 if the holes 3 are within the tangent lines 13 and tends to break at the centres of the legs 8 if the holes 3 are outside the tangent lines 13. For the point of view of consistency of product, it is preferred to have the breaks in the centres of the strands 6 as the strength at rupture is easier to measure. There is little change in the cover, i.e. in the weight of plastics material per unit area. However, if the small holes 3 are outside, or towards the outside of, the tangent lines 13, the legs 8 are weaker and are less capable of pulling the orientation right across the bars 9 or of orientating the bars 9 more than a low degree N-S. This is an advantage in that the orientation across the bars 9 is automatically controlled.

It will be noted that the forces in the zones 7 are not precisely N-S as they must pass around the small holes 3. It is in theory possible to have the small holes 3 as pin holes, with no material removal, but this is difficult in manufacture.

The structure 4 of FIG. 1b can be stretched further N-S. Further stretching gives a lower unit weight, higher tensile strength and greater resistance to creep, but there is more danger of cracking across the bars 9. The stretch ratio on the strands 6,8 can be as high as 12:1 or more. In general however it is preferred that the reduction in thickness across the bars 9 should not be greater than two-thirds of the original thickness, maintaining the orientation at a relatively low level.

FIG. 1c

Figure 1C:
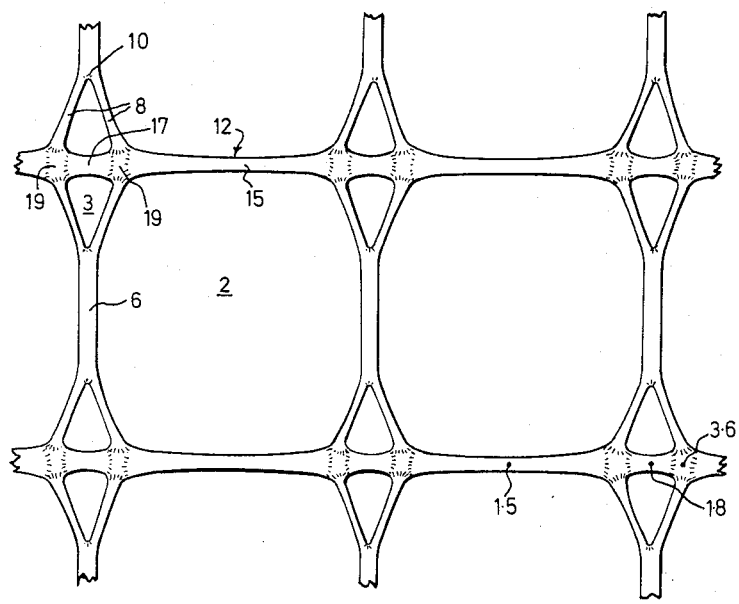

The structure 12 of FIG. 1c has been produced by stretching E-W the structure 4 of FIG. 1b. Some N-S contraction can be permitted, and occurred in the structure illustrated. Alternatively, the structure of 4 of FIG. 1b could be stretched slightly less, and the subsequent E-W stretch performed with full restraint, increasing the effective N-S stretch somewhat; the increase in effective N-S stretch could be reduced by making the legs 8 longer, e.g. by having the holes 3 elongated in the N-S direction. The zones 14 in FIG. 1b, where the bars 9 are thickest, have stretched out to form first highly orientated main strands 15, and the zones 16 in the structure 4, where the bars 9 are thinnest, have stretched out to form second highly orientated main strands 17, aligned with the strands 15. The original holes 3 form generally triangular mesh openings 3. The stretch ratio in the strands 15 can be 6:1, 7:1 or 8:1, and the stretch ratio in the strands 17 will be about the same. The strands 15,17 are interconnected with the strands 8 at junctions or junction zones 19 which can be similar to those of the biax structure of GB No. 2 035 191B. The junctions 19 contain material which is unorientated or orientated only to a low degree (less than two-thirds reduction in thickness). The small blobs 10 will remain, though opening out the legs 8 can orientate the crotches between the legs 8 in the direction running around the crotch.

It will be seen that if the holes 3 in the starting material 1 are within the tangent lines 13, as shown, the zones 16 are much smaller than the zones 14 and the zones 16 stretch first. If however the small holes 3 are outside the tangent lines 13, the zones 14 will be narrower and will stretch first. Equal widths for the zones 14,16 can be arranged by having the holes 3 outside and touching the tangent lines 13 (as shown at 3').

The bias structure of FIG. 1c is particularly suitable for soil stabilization, having slightly smaller main mesh openings 2 than those of the equivalent biax structure of GB No. 2 035 191B whilst remaining substantially inextensible in the E-W direction.

FIGS. 2a and 2b

The starting material 1 of FIG. 2a is the same as that of FIG. 1a, but it is stretched in the direction at right angles to that of FIG. 1a. Some E-W contraction occurred. In the structure 4 of FIG. 2b, the zones 14 in the starting material 1 have been stretched out into highly orientated interconnecting strands 21. The zones 16 have been stretched out into short, fairly highly orientated strands 22, forming a direct continuation of the strands 21. The zones 5 have been stretched out into short, fairly highly orientated strands 23. The strands 22, 23 may for instance be stretched to a ratio of about 4:1 (on the strands). Zones 24 remain (corresponding to those parts of the zones 5 in the starting material 1 which are immediately adjacent the large holes 2), and form part of continuous parts or bands 24' extending E-W across the structure. The zones of the bands which are aligned with the strands 21 are orientated N-S but are thicker than the strands 21 and about the same thickness as the strands 22 and 23. Two notional E-W lines 11,12 can be drawn, the line 11 crossing twice as many strands 22,23 as the strands 21 crossed by the line 12. The mesh openings 2 are substantially longer N-S than the mesh openings 3.

The structure 4 of FIG. 2b is suitable for soil reinforcement, the thicker zones 24 giving a good locking structure. The structure 4 also has use in cement reinforcement as it can be very highly stretched, for instance to overall stretch ratios of up to 8:1, giving high stretch ratios on the strands 21,22,23. In this condition, though there is a danger of cracking N-S along the strands, the structure can find use in a rigid matrix such as cement where there is no danger of distortion by unequal movement.

In a variation, the subsidiary, small holes 3 in the starting material 1 could be omitted from between alternate adjacent E-W rows of large holes 2, giving alternate, relatively thick bars as in the uniax structure of GB No. 2 073 090B.

FIGS. 3a and 3b

In the starting material 1, all the holes (or depressions) 2,2′ are identical. There is a basic pattern of E-W rows of first holes 2 on a notional square or rectangular grid, a further E-W row of second holes 2′ being in the middle of every alternate pair of rows of holes 2. The holes 2′ are staggered so as to be half way between the holes 2, as seen looking N-S. On stretching N-S, a uniax structure 4 is formed. With the particular structure 4 illustrated, there was no E-W constraint and slight E-W contraction occurred. The structure 4 has pronounced continuous E-W parts, bands or bars 31 interconnected by highly orientated first strands 32, second strands 33 and third strands 34. Each end of each strand 32 forks into two strands 33, and one end of each strand 34 is directly connected to a bar 31 whilst the other end also forks into two strands 33. As above, two notional E-W lines 11,12 can be drawn, the first line 11 crossing twice as many strands 33 as the strands 32 or 34 crossed by the second line 12. The mesh openings 2′ of one E-W row of mesh openings are substantially longer, as measured in the N-S direction, than the openings 2 of the other E-W rows. The mesh openings 2′ are substantially larger than, and overlap, the mesh openings 2.

In detail, the bars 31 can be as described in relation to the uniax structure of GB No. 2 073 090B, and can either be completely unorientated along their E-W centre lines, or can have orientation to a low degree in the zones between aligned strands 34. There are small blobs 35, similar to the blobs 10 of FIG. 1b, in the crotches between the strands 33.

The structure 4 is useful for soil reinforcement. The highly orientated interconnecting strands 32,33,34 between the bars 31 form a configuration which can move slightly sideways (E-W) so that for instance stones in the soil can lock through to the other side.

The N-S pitching of the holes in the starting material 1 was such that the cross-sectional area at the midpoints of the strands 32,34 was the same, and about double that at the mid-points of the strands 33. The important parameter is the width C of the zones 36, 36′ which form the strands 32,34 in relation to the width D of the zones 37 which form the strands 33, it being understood that the force applied to the zones 37 is at a substantial angle to the N-S direction. By different pitching, it is possible to obtain between the bars 31 the structure described in GB No. 2 034 240A.

FIG. 3c

Figure 3C:
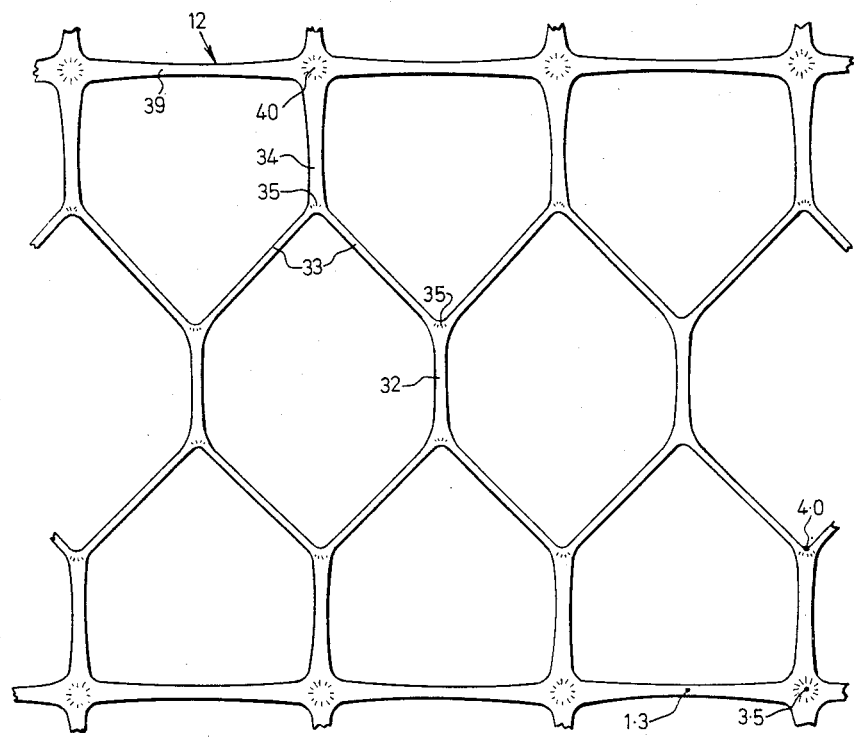

FIG. 3c shows the biax structure 12 produced by stretching the uniax structure 4 of FIG. 3b E-W, with no contraction (as for MD stretching followed by TD stretching in production). The zones 38 of the bars 31 stretch out to form main strands 39 connected to each other and to the strands 34 at junctions or junction zones 40 which can be generally similar to those of the biax product of GB No. 2 035 191B. The junctions 40 contain material which is unorientated or orientated only to a low degree (less than two-thirds reduction in thickness).

As in the structure 4 of FIG. 1c, the blobs 35 are slightly pulled out during the E-W stretch, and the crotches between the strands 33 are orientated in the direction running the crotch. Due to the N-S restraint, the strands 33 stretch somewhat in the E-W stretch.

The structure 12 is useful for soil stabilization, and acts as a stabilized form of the uniax or biax structures of GB No. 2 034 240A. Thus there are continuous lines of material running E-W, preventing E-W tension causing N-S shortening when laying the material. Compared to the biax structure of GB No. 2 035 191B, there is greater flexibility of the highly orientated interconnecting strands 32,33,34 between the highly orientated main strands 39.

Figures 4A, 4B:
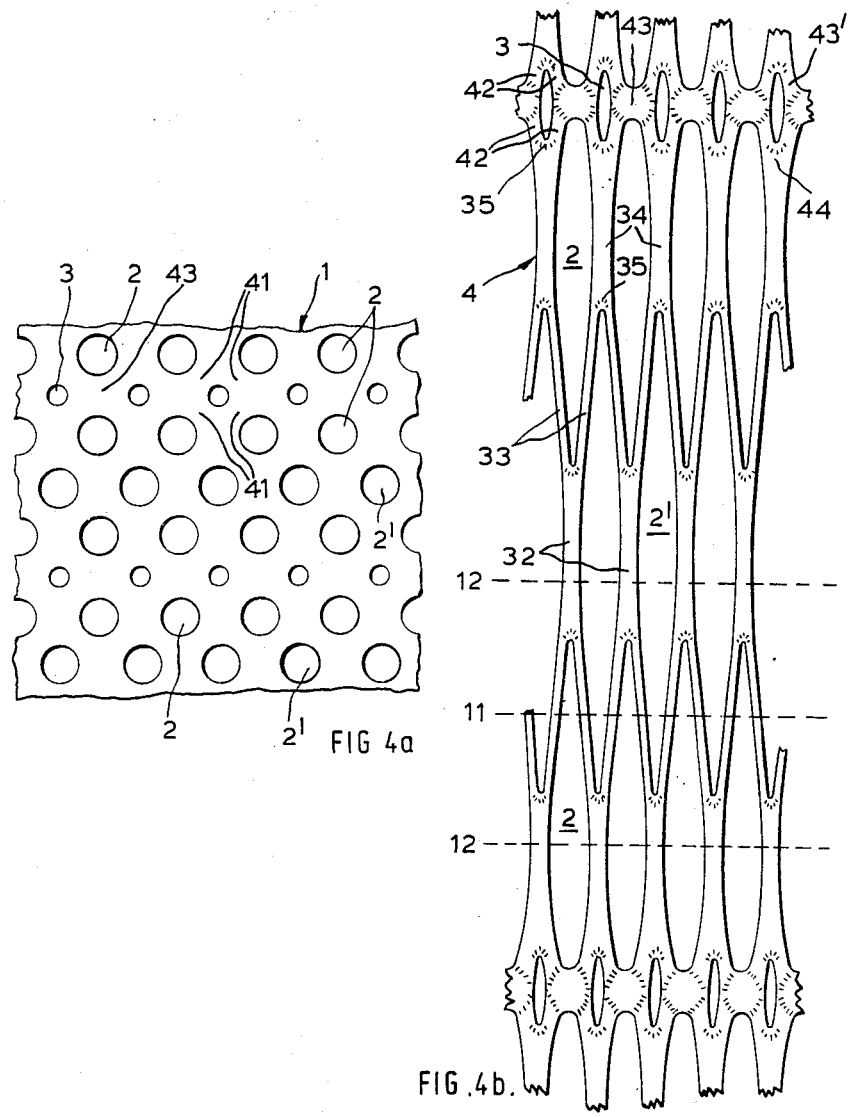
FIGS. 4a, 4b and 4c are plan views of a starting material, uniax structure and biax structure in accordance with the invention.

FIGS. 4a and 4b

The starting material 1 of FIG. 4a is similar to that of FIG. 3a, except that there are small, third holes (or depressions) 3 between the large holes 2 of alternate E-W rows. When the starting material 1 is stretched N-S, the adjacent rows of holes 2,2′,2 behave as in the case of FIGS. 3a and 3b, and the same references are used on FIG. 4b to indicate similar parts. However, the bars 31 are not formed, the structure instead being similar to the square mesh uniax structures of GB No. 2 096 531A. Thus the zones 41 between adjacent holes 2,3 stretch out to form highly orientated legs 42 whose axes are inclined to each other but which extend generally N-S; the discontinuous parts, lengths or zones 43 between adjacent holes 3 remain as unorientated or partially orientated zones 43 in the uniax structure 4. There are E-W bands 43′ running through the structure formed of the regularly-spaced zones 43 interrupted by regularly-spaced mesh openings 3 and connected to the adjacent zone 43 by four legs 42 (two on each side). The legs 42 themselves are connected together at junctions generally indicated as 44 to which are connected the interconnecting strands 34.

The structure 4 of FIG. 4b is useful for soil reinforcement, and has the advantages of the structure 4 of FIG. 3b. In addition, there is more flexibility across the structure because the zones 43 can bend with respect to each other by twisting the legs 42, giving greater transverse flexibility. This is useful where the soil contains stones.

If the holes 3 in the starting material 1 had been the same size as the holes 2, 2′, the structure 4 of FIG. 4b would not have been produced. As many variations on the shapes of the holes 2,2′,3 are possible including variations where the E-W sides actually touch one another, there can be starting materials where the holes are of considerably different shape—this is applicable generally to the invention and not just to FIGS. 4a and 4b. In general, the test of whether dissimilar holes are the same size is an empirical one, i.e. whether the structure produced is in accordance with the invention. However, the determining parameter may be the relative plan view areas of the holes, or the relative total lengths of the peripheries of the holes, or the relative maximum dimensions of the holes, or the relative minimum dimensions of the holes or the relative dimensions of the holes in the stretching direction(s). Effectively, the hole size is only an indication as the way in which the starting material stretches depends upon the relative widths of the zones between the holes—see the discussions above of the widths A,B, C and D (FIGS. 1a and 3a).

FIG. 4c

Figure 4C:
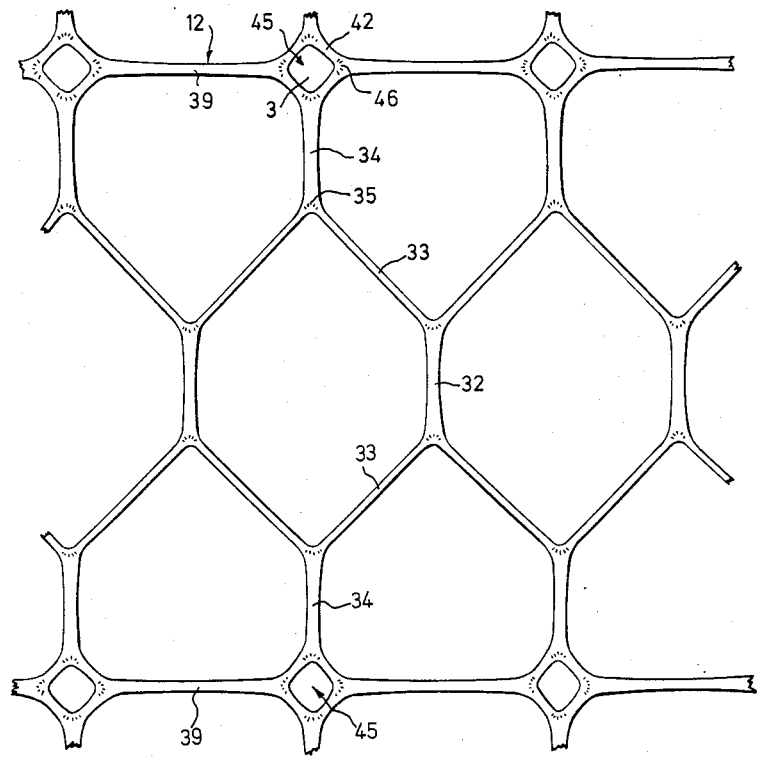

The structure 12 of FIG. 4c has been formed by stretching E-W the structure 4 of FIG. 4b with total N-S restraint. The zones 43 have stretched out to form main strands 39 and the legs 42 have stretched out somewhat, forming junction zones 45 generally as in the biax square mesh structures of GB No. 2 096 531A. The junction zones 45 are formed of rings of plastics material comprising the four legs 42 in a diamond configuration with blobs 46 of plastics material which has been orientated only to a low degree (about two-thirds or less reduction in thickness), the crotches between adjacent legs 42 being orientated in the direction running around the crotch.

Apart from the junction zones 45, which differ from the junctions 40 shown in FIG. 3c, the structure 12 of FIG. 4c is very similar to that of FIG. 3c, and the same references are used for similar parts. The advantages are similar to those of the structure 12 of FIG. 3c, though the structure is not completely stable in the E-W direction, some slight extension being possible.

Table

All holes 2, 2', 3 are circular. The material was nominally 4.5 mm thick HDPE in all cases. Stretching was carried out at 99° C. The materials were relaxed 5 to 10% by controlled shrinkage at the stretching temperature.

TABLE 1

| FIG. | Holes 2 Diameter | Holes 2 NS pitch | Holes 2 EW pitch | Holes 2' Diameter | Holes 3 Diameter | Holes 3 NS pitch | Holes 3 EW pitch | Overall stretch ratio NS | Overall stretch ratio EW | Width of bar ÷ thickness of starting material min | Width of bar ÷ thickness of starting material max |
|---|---|---|---|---|---|---|---|---|---|---|---|
| 1a | 12.7 | 25.4 | 25.4 | — | 3.2 | 9.5/15.9 | 25.4 | — | — | — | — |
| 1b | — | — | — | — | — | — | — | 6.25:1 | — | 1.4 | 2.8 |
| 1c | — | — | — | — | — | — | — | — | 5.0:1 | — | — |
| 2a | 12.7 | 25.4 | 25.4 | — | 3.2 | 25.4 | 9.5/15.9 | — | — | — | — |
| 2b | — | — | — | — | — | — | — | 6.0:1 | — | 1.1 | — |
| 3a | 12.7 | 25.4/31.8 | 25.4 | 12.7 | — | — | — | — | — | — | — |
| 3b | — | — | — | — | — | — | — | 7.3:1 | — | 2.8 | — |
| 3c | — | — | — | — | — | — | — | — | 6.0:1 | — | — |
| 4a | 12.7 | 25.4/31.8 | 25.4 | 12.7 | 3.2 | 54.0 | 25.4 | — | — | — | — |
| 4b | — | — | — | — | — | — | — | 7.3:1 | — | — | — |
| 4c | — | — | — | — | — | — | — | — | 6.0:1 | — | — |

I claim:

1. An integral plastics material mesh structure which has been uniaxially stretched, and comprises a substantial number of spaced parallel parts which run substantially right across the structure substantially at right angles to the direction of stretch, said parts comprising at least zones regularly spaced along their lengths which are unorientated or orientated only to a low degree, and said parts either being continuous or being discontinuous and interrupted by regularly-spaced mesh openings, each discontinuous length so formed being connected to the adjacent discontinuous length of the same said part by at least two highly orientated strands whose axes are inclined to each other but which extend generally in the direction of stretch, and each of which highly-orientated strands has one end connected to a respective said discontinuous length and the other end connected to the other highly orientated strand at a junction; said continuous parts being connected to adjacent said continuous parts, or said junctions of said discontinuous parts being connected to said junctions of adjacent said discontinuous parts, by highly orientated interconnecting strands extending generally in the direction of stretch, said interconnecting strands comprising generally-parallel, spaced, side-by-side strands, an end of each of which side-by-side strands forks into only two further generally parallel said interconnecting strands, whereby there are two notional lines across said structure, said two notional lines lying between two adjacent said continuous parts or between said junctions of two adjacent said discontinuous parts, and extending substantially at right angles to the direction of stretch, such that a first said notional line crosses substantially more said interconnecting strands than the second said notional line.

2. The structure of claim 4, wherein both ends of each said first strand fork into two said interconnecting strands.

3. The structure of claim 1, wherein said interconnecting strands form rows of mesh openings extending substantially at right angles to the direction of stretch, the mesh openings in one row being substantially longer, as measured in the direction of stretch, than the mesh openings in another row.

4. A method of producing an integral plastics material mesh structure, comprising stretching the uniaxially-stretched structure defined in claim 1 in a direction substantially at right angles to said direction of stretch.

5. A method of producing an integral plastics material mesh structure, comprising stretching in at least one stretching direction a plastics starting material having a regular pattern of holes or depressions therein, the pattern of holes or depressions comprising:

at least two rows of first holes or depressions, said rows extending substantially at right angles to said stretching direction, said rows being adjacent with no intervening row of holes or depressions which are the same size or larger, the first holes or depressions having their centres on a notional, substantially square or rectangular grid with the side thereof substantially parallel to the stretching direction, and the first holes or depressions being of substantially the same size; and rows of second holes or depressions with the centre lines of the rows between and substantially parallel to the centre lines of the rows of first holes or depressions, said second holes or depressions being offset with respect to said first holes or depressions, as viewed in said stretching direction, and said second holes or depressions being substantially smaller than the first holes or depressions and not positioned substantially on the intersections of the notional diagonals joining two immediately adjacent first holes or depressions in one row with two immediately adjacent first holes or depressions in the immediately adjacent row of first holes or depressions and which form a square or rectangular configuration with the two first holes or depressions of said one row, whereby a structure is formed comprising generally-parallel, spaced, side-by-side, orientated strands extending generally in said stretching direction, an end of each of which side-by-side strands forks into only two further, generally parallel orientated strands.

6. The method of claim 5, wherein the pattern comprises two rows of the second holes or depressions with their centre lines between the centre lines of two immediately adjacent rows of the first holes or depressions, the second holes or depressions having their centres on a notional square or rectangular grid, and the second holes or depressions being staggered so as to be substantially half way between the first holes or depressions as viewed looking in said streching direction.

7. An integral plastics material mesh structure which has been stretched in two stretching directions, comprising:
- aligned, highly orientated main strands running substantially parallel to one said stretching direction, the end of one main strand being connected to the adjacent end of the next main strand by way of a junction zone containing unorientated plastics material or plastics material which has been orientated only to a low degree;
- further such main strands extending substantially parallel to but spaced from the first-mentioned main strands, the end of one further main strand being connected to the adjacent end of the next further main strand by way of a junction zone containing unorientated plastics material or plastics material which has been orientated only to a low degree; and
- highly orientated interconnecting strands interconnecting the junction zones of adjacent, substantially parallel main strands, the interconnecting strands comprising substantially parallel, spaced, highly orientated first interconnecting strands extending substantially parallel to the other stretching direction, at least one end of each first interconnecting strand forking into two second interconnecting strands, the other ends of of which are connected indirectly or directly to a said junction zone;
- two said main strands and two said interconnecting strands meeting at any one said junction zone.

8. The structure of claim 7, wherein both ends of each first interconnecting strand fork into two second interconnecting strands, the other ends of which are connected indirectly or directly to respective said junction zones.

9. The structure of claim 7, wherein the second interconnecting strands are directly connected to respective said junction zones, forming a generally triangular-shaped mesh opening with a respective main strand.

10. The structure of claim 7, wherein the second interconnecting strands are connected to respective junction zones by means of third, parallel, spaced, highly orientated interconnecting strands extending substantially parallel to the other stretching direction, two respective second interconnecting strands connected to adjacent first interconnecting strands running into a single third interconnecting strand.

11. The structure of claim 7, wherein the junction zones do not contain a mesh opening.

12. The structure of claim 7, wherein the junction zones are formed by rings of plastics material with a mesh opening in the centre.

13. A method of producing an integral plastics material mesh structure, comprising stretching in at least one stretching direction a plastics starting material having a regular pattern of holes or depressions therein, the pattern of holes or depressions comprising:
- groups of rows of first holes or depressions, said rows extending substantially at right angles to said stretching direction, each said group comprising at least two said rows and said rows in each said group being adjacent with no intervening row of holes or depressions which are the same size or larger, the first holes or depressions having their centres on a notional, substantially square or rectangular grid with the side thereof substantially parallel to the stretching direction, and the first holes or depressions being of substantially the same size; and
- rows of second holes or depressions with the centre lines of the rows between and substantially parallel to the centre lines of the rows of first holes or depressions, said second holes or depressions being offset with respect to said first holes or depressions, as viewed in said stretching direction, and not being substantially smaller than said first holes or depressions, said stretching out into generally-parallel, spaced, side-by-side, first orientated strands extending generally in said stretching direction, zones between adjacent said first holes or depressions in any one said row, and also stretching out into further, generally-parallel, second, orientated strands forking from the ends of said first strands, zones between respective adjacent said first holes or depressions and said second holes or depressions.

14. The method of claim 13, wherein the pattern comprises two rows of the first holes or depressions forming a said group, a row of the second holes or depressions which are substantially the same size as the first holes or depressions but are staggered so as to be substantially half way between the first holes and depressions as viewed looking in said stretching direction, two further rows of the first holes or depressions forming another said group, aligned with the first-mentioned first holes or depressions, and so on.

15. The method of claim 14, wherein there are third holes or depressions with their centres positioned between the immediately adjacent rows of first holes or depressions, the third holes or depressions being substantially smaller than the first holes or depressions and positioned substantially on the intersections of notional diagonals joining two immediately adjacent first holes or depressions in one row of said group with two immediately adjacent first holes or depressions in the other row of said group and which form a square or rectangular configuration with the two first holes or depressions of said one row.

16. The method of claim 13, wherein there are two said rows of first holes or depressions in each said group, with no holes or depressions between said rows in said group.

17. The method of claim 13, wherein there are two said rows of first holes or depressions in each said group, and a row of third holes or depressions is positioned between said two rows with the centre line substantially parallel to the centre lines of said rows of first holes or depressions, said third holes or depressions being substantially smaller than the first holes or depressions and positioned substantially on the intersections of notional diagonals joining two immediately adjacent first holes or depressions in one row of said group with two immediately adjacent first holes or depressions in the other row of said group and which form a square or rectangular configuration with the two first holes or depressions of said one row.

* * * * *